(12) United States Patent
Tsuchikiri et al.

(10) Patent No.: US 9,043,079 B2
(45) Date of Patent: May 26, 2015

(54) GENERATION OF REFERENCE VALUE FOR VEHICLE FAILURE DIAGNOSIS

(75) Inventors: Hideyuki Tsuchikiri, Tokyo (JP); Yasushi Sato, Tokyo (JP); Jiro Aihara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 23 days.

(21) Appl. No.: 13/123,354

(22) PCT Filed: Sep. 24, 2009

(86) PCT No.: PCT/JP2009/004818
§ 371 (c)(1),
(2), (4) Date: Apr. 8, 2011

(87) PCT Pub. No.: WO2010/041382
PCT Pub. Date: Apr. 15, 2010

(65) Prior Publication Data
US 2011/0196572 A1 Aug. 11, 2011

(30) Foreign Application Priority Data
Oct. 10, 2008 (JP) .................................. 2008-264593

(51) Int. Cl.
*G01M 17/00* (2006.01)
*G01F 7/00* (2006.01)
(Continued)

(52) U.S. Cl.
CPC .............. *G07C 5/0808* (2013.01); *B60R 25/00* (2013.01); *G07C 5/085* (2013.01)

(58) Field of Classification Search
CPC ......... G06F 17/60; G06F 3/16; G11B 5/5582; G11B 21/12; G05B 15/02; G05B 19/042; G05B 17/02; G05B 23/0216; G05B 23/0283; B60R 25/00; B60S 5/00; G06K 9/481; G08G 1/09675; H07N 7/165; H07N 12/4667; G01M 17/00

USPC ........... 706/25; 705/4, 7.41, 7.29, 305, 14.58; 701/33.4, 31.4, 31.9, 103, 105, 114, 701/45, 32.2, 32.8, 22, 29.3, 31, 4, 33, 36; 123/90.1, 447; 702/182, 34, 196; 714/47.2; 360/31; 60/276, 277; 700/79, 700/86, 286; 340/5.7; 382/197; 725/46
See application file for complete search history.

(56) References Cited

U.S. PATENT DOCUMENTS
5,170,343 A * 12/1992 Matsuda ......................... 700/79
5,638,296 A * 6/1997 Johnson et al. ................ 700/286
(Continued)

FOREIGN PATENT DOCUMENTS
JP 62-261938 11/1987
(Continued)

OTHER PUBLICATIONS
International Search Report, PCT/JP2009/004818, Nov. 17, 2009, a total of 3 pages.

*Primary Examiner* — Tuan C. To
*Assistant Examiner* — Yuri Kan
(74) *Attorney, Agent, or Firm* — Squire Patton Boggs (US) LLP (57) ABSTRACT

Data during normal driving is generated using travel data during the occurrence of a failure or the like, the travel data being accumulated into ordinary vehicles traveling in a city or other places on a daily basis. A failure diagnosis of a vehicle is performed by comparing a reference value with the time sequence electronic control unit (ECU) data of a plurality of driving parameters during the occurrence of a failure, the data being stored into a storage device in the ECU of the vehicle when a failure of the vehicle has occurred. The time sequence ECU data obtained from a large number of vehicles are sequentially accumulated and stored and the numerical vectors of the accumulated time sequence ECU data are generated. The numerical vectors are clustered and classified into a plurality of clusters according to the characteristics. In each of the plurality of clusters, a range of high occurrence rate values is obtained for the values of the respective driving parameters. The obtained range of high occurrence rate values is then stored as a range of the normal values of the driving parameters, and the range of the normal values is set as the reference value for a failure diagnosis.

16 Claims, 4 Drawing Sheets

(51) Int. Cl.
  *B60S 5/00* (2006.01)
  *G07C 5/08* (2006.01)
  *B60R 25/00* (2013.01)

(56) References Cited

U.S. PATENT DOCUMENTS

| | | | |
|---|---|---|---|
| 5,727,383 A * | 3/1998 | Yamashita et al. | 60/276 |
| 6,006,146 A * | 12/1999 | Usui et al. | 701/31.9 |
| 6,053,147 A * | 4/2000 | Hemmerlein et al. | 123/447 |
| 6,076,504 A * | 6/2000 | Stavnheim et al. | 123/447 |
| 6,134,488 A * | 10/2000 | Sasaki et al. | 701/32.8 |
| 6,314,375 B1 * | 11/2001 | Sasaki et al. | 702/34 |
| 6,484,109 B1 * | 11/2002 | Lofall | 702/56 |
| 6,581,371 B1 * | 6/2003 | Orzel et al. | 60/277 |
| 7,042,663 B2 * | 5/2006 | Shimotono et al. | 360/31 |
| 7,383,238 B1 * | 6/2008 | Iverson | 706/25 |
| 7,765,039 B1 * | 7/2010 | Hagenbuch | 701/32.2 |
| 2001/0049579 A1 * | 12/2001 | Fujino et al. | 701/114 |
| 2002/0059075 A1 * | 5/2002 | Schick et al. | 705/1 |
| 2002/0188392 A1 * | 12/2002 | Breed et al. | 701/45 |
| 2003/0050747 A1 * | 3/2003 | Kamiya | 701/33 |
| 2003/0055666 A1 * | 3/2003 | Roddy et al. | 705/1 |
| 2004/0003401 A1 * | 1/2004 | Gutta et al. | 725/46 |
| 2004/0054507 A1 * | 3/2004 | Mott | 702/196 |
| 2004/0181712 A1 * | 9/2004 | Taniguchi et al. | 714/47 |
| 2005/0049832 A1 * | 3/2005 | Gorinevsky | 702/182 |
| 2006/0030993 A1 * | 2/2006 | Goodell et al. | 701/101 |
| 2006/0196167 A1 * | 9/2006 | Odajima et al. | 60/277 |
| 2006/0200258 A1 * | 9/2006 | Hoffberg et al. | 700/86 |
| 2006/0260573 A1 * | 11/2006 | Urushihata et al. | 123/90.15 |
| 2007/0005206 A1 * | 1/2007 | Zhang et al. | 701/36 |
| 2008/0086257 A1 * | 4/2008 | Iihoshi et al. | 701/105 |
| 2008/0103675 A1 * | 5/2008 | Ishizuka et al. | 701/103 |
| 2008/0117020 A1 * | 5/2008 | Martin | 340/5.7 |
| 2008/0137961 A1 * | 6/2008 | Ishida et al. | 382/197 |
| 2008/0162017 A1 * | 7/2008 | Nagata et al. | 701/103 |
| 2008/0172169 A1 * | 7/2008 | Kuronita et al. | 701/103 |
| 2009/0138153 A1 * | 5/2009 | Mylaraswamy et al. | 701/33 |
| 2009/0216584 A1 * | 8/2009 | Fountain et al. | 705/7 |
| 2009/0254243 A1 * | 10/2009 | Uchihashi et al. | 701/33 |
| 2009/0306841 A1 * | 12/2009 | Miwa et al. | 701/22 |
| 2010/0101409 A1 * | 4/2010 | Bromberg et al. | 95/8 |
| 2011/0153154 A1 * | 6/2011 | Hagenbuch | 701/35 |
| 2011/0196572 A1 * | 8/2011 | Tsuchikiri et al. | 701/35 |
| 2011/0208567 A9 * | 8/2011 | Roddy et al. | 705/7.41 |
| 2012/0036016 A1 * | 2/2012 | Hoffberg et al. | 705/14.58 |
| 2012/0209634 A1 * | 8/2012 | Ling et al. | 705/4 |

FOREIGN PATENT DOCUMENTS

| | | | |
|---|---|---|---|
| JP | 06-095881 | | 4/1994 |
| JP | 2004227439 A * | 8/2004 | G06F 17/60 |
| JP | 2005-117756 | | 4/2005 |
| JP | 2007-281959 | | 10/2007 |

* cited by examiner

| Time (sec) | Rn (rpm) | | | | Vn (km/h) | | | | Tn (°C) | | | |
|---|---|---|---|---|---|---|---|---|---|---|---|---|
| | $Rn_{av}$ | $Rn_{mx}$ | $Rn_{mn}$ | $Rn_{in}$ | $Vn_{av}$ | $Vn_{mx}$ | $Vn_{mn}$ | $Vn_{in}$ | $Tn_{av}$ | $Tn_{mx}$ | $Tn_{mn}$ | $Tn_{in}$ |
| -14.8~ -12.0 | $Rn_{av-1}$ | $Rn_{mx-1}$ | $Rn_{mn-1}$ | $Rn_{in-1}$ | $Vn_{av-1}$ | $Vn_{mx-1}$ | $Vn_{mn-1}$ | $Vn_{in-1}$ | $Tn_{av-1}$ | $Tn_{mx-1}$ | $Tn_{mn-1}$ | $Tn_{in-1}$ |
| -11.8~ -9.0 | $Rn_{av-2}$ | $Rn_{mx-2}$ | $Rn_{mn-2}$ | $Rn_{in-2}$ | $Vn_{av-2}$ | $Vn_{mx-2}$ | $Vn_{mn-2}$ | $Vn_{in-2}$ | $Tn_{av-2}$ | $Tn_{mx-2}$ | $Tn_{mn-2}$ | $Tn_{in-2}$ |
| -8.8~ -6.0 | $Rn_{av-3}$ | $Rn_{mx-3}$ | $Rn_{mn-3}$ | $Rn_{in-3}$ | $Vn_{av-3}$ | $Vn_{mx-3}$ | $Vn_{mn-3}$ | $Vn_{in-3}$ | $Tn_{av-3}$ | $Tn_{mx-3}$ | $Tn_{mn-3}$ | $Tn_{in-3}$ |
| -5.8~ -3.0 | $Rn_{av-4}$ | $Rn_{mx-4}$ | $Rn_{mn-4}$ | $Rn_{in-4}$ | $Vn_{av-4}$ | $Vn_{mx-4}$ | $Vn_{mn-4}$ | $Vn_{in-4}$ | $Tn_{av-4}$ | $Tn_{mx-4}$ | $Tn_{mn-4}$ | $Tn_{in-4}$ |
| -2.8~ 0 | $Rn_{av-5}$ | $Rn_{mx-5}$ | $Rn_{mn-5}$ | $Rn_{in-5}$ | $Vn_{av-5}$ | $Vn_{mx-5}$ | $Vn_{mn-5}$ | $Vn_{in-5}$ | $Tn_{av-5}$ | $Tn_{mx-5}$ | $Tn_{mn-5}$ | $Tn_{in-5}$ |

GENERATION OF REFERENCE VALUE FOR VEHICLE FAILURE DIAGNOSIS

TECHNICAL FIELD

The present invention relates to collecting data stored in a storage device in an electronic control unit (ECU) of each vehicle during driving of the vehicle, and generating normal value data of various driving parameters as a reference of a failure diagnosis.

BACKGROUND

There is known a diagnosis unit as a tool for diagnosing a failure of a vehicle such as automobile. In recent years, there is considered that a so-called expert system for registering information on failures occurring in the past in database and estimating a cause of a newly occurring failure is used for a diagnosis machine. The expert system includes a rule base estimation system in which human experience knowledge is registered in database for retrieval and a model base estimation system in which behaviors of the system during normal time or failure are learned for retrieving a failure cause via simulation.

In the former system, a mechanism is simple and a relatively high reliability can be expected but the knowledge is difficult to rule and a rule needs to be added or modified each time the target system is changed.

On the other hand, in the latter system, even if an operating staff does not have sufficient experience or knowledge, a failure site can be estimated and a certain degree of versatility can be expected in terms of the change in the target system. Particularly, a method for comparing data during normal time with data during failure under the same driving environmental condition is one of the most effective means for finding a cause of a failure.

However, since various environmental conditions or travel patterns are present for the driving of a vehicle and a range of normal values, which a large number of respective driving parameters can take depending on a respective situation, can be independently changed, the data during normal time needs to be collected under various driving situations in order to obtain normal value data for comparing items of data under similar conditions and to make an accurate decision.

For the purpose, a dedicated test vehicle provided with a driving data accumulation unit is utilized for conducting a large amount of travel tests, and data collection and accumulation needs a lot of labor.

Japanese Patent Application Laid-Open No. 62-261938 Publication (Patent Literature 1) describes therein a diagnosis unit comprising a knowledge data storing means for storing accurate information on a relationship between a symptom of a failure and a cause thereof, and a rare case storing means for storing inaccurate information.

Japanese Patent Application Laid-Open No. 6-95881 Publication (Patent Literature 2) describes therein analyzing design data or past failure data and inputting it as EMEA in a positive estimation system in relational database, creating a modified EMEA and then an event sequence diagram, creating a failure retrieval three for reference to a rule base, and digitizing an expert know-how to create a rule base.

DOCUMENTS OF RELATED ART

Patent Literature

Patent Literature 1: Japanese Patent Application Laid-Open No. 62-261938 Publication
Patent Literature 2: Japanese Patent Application Laid-Open No. 6-95881 Publication

SUMMARY OF THE INVENTION

If much driving data can be obtained from ordinary vehicles driving in a city or other places on a daily basis instead of data collection through the driving of a test vehicle provided with a driving data accumulation unit, the data collection through the driving of the test vehicle is not required.

However, the driving data accumulation performed in ordinary vehicles is limited to data during the occurrence of a failure which is recoded as diagnosis information in an ECU when the failure occurs.

The data recorded and accumulated as the data during the occurrence of a failure in the ECU is a collection of various driving parameters, where part of the parameters relating to the failure have abnormal values and most of the parameters have normal values.

Thus, it is an object of the present invention to provide an apparatus for utilizing travel data such as a time when a failure occurs, which is accumulated in an ordinary vehicle travelling in a city or other places in a daily basis, to generate data during normal driving.

DISCLOSURE OF THE INVENTION

In order to solve the above problem, the present invention provides a reference value generating apparatus for failure diagnosis that compares time sequence electronic control unit (ECU) data with a reference value for a plurality of driving parameters during the occurrence of a failure which is stored in a storing device of the electronic control unit (ECU) of a vehicle when the failure occurs in the vehicle, and that makes a failure diagnosis of the vehicle. The reference value generating apparatus comprises an accumulation unit that sequentially accumulates and stores the time sequence ECU data obtained from a large number of vehicles, and means for generating numerical vectors of the time sequence ECU data accumulated in the accumulation unit.

The numerical vectors are clustered and classified into a plurality of clusters according to the characteristics, a range of high occurrence rate values is obtained for the parameter values of the respective driving parameters in each of the plurality of clusters, the range of high occurrence rate values, which is obtained by the occurrence rate calculating means, is then stored as a range of the normal values of the driving parameters, and the range of the normal values is set as the reference value for a failure diagnosis.

According to one embodiment, the means for generating a numerical vector divides the time sequence ECU data into a plurality of time zones, and generates the numerical vector for each time zone. The numerical vectors for the time zones are clustered.

BEST MODES FOR CARRYING OUT THE PRESENT INVENTION

Figure 1:
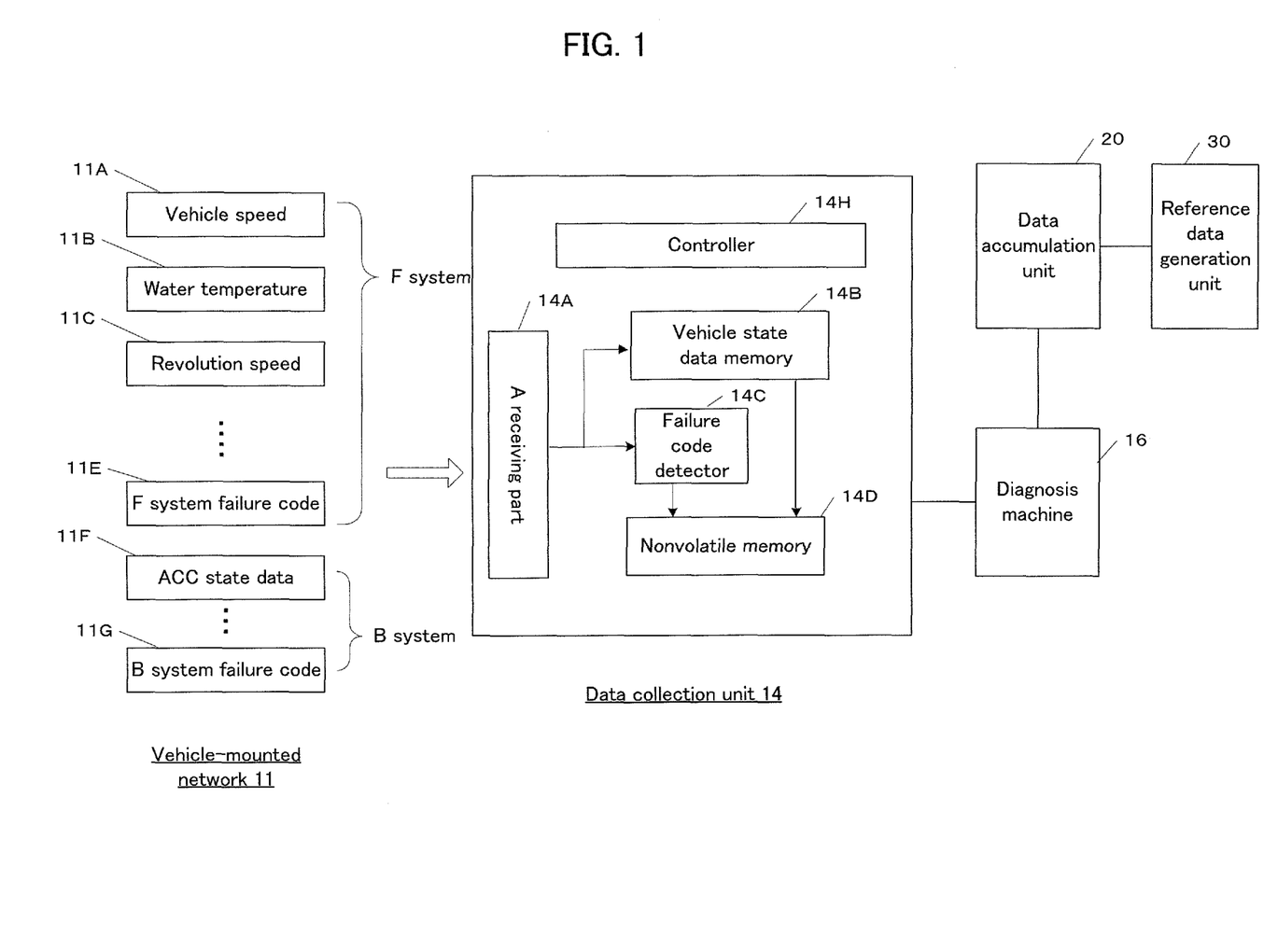
FIG. 1 is a diagram showing an entire structure of an apparatus according to one embodiment of the present invention.

An embodiment of the present invention will be described below with reference to the drawings. FIG. 1 shows a data collection unit 14 included in an electronic control system of a vehicle on which the present invention is based. A vehicle-mounted network 11 is a network for making communication between a plurality of electronic control units (ECU) mounted on the vehicle. In the embodiment, the network is divided into two systems such as F system and B system, but it may have only one system. The F system network is a network for making communication among a plurality of ECUs, which are so-called control systems, such as ECU for performing fuel ignition control and ignition timing control of an engine, ECU for controlling a transmission and ECU for performing brake control. The B system network is a network for making communication among a plurality of ECUs, which are so-called body's electric components system, such as ECU for controlling power windows or door locks. ECU for controlling lights, and ECU for controlling electric components such as air conditioner. The ECUs are basically computers, each of which is configured of a microprocessor and a communication module.

The F system network sends control system data such as vehicle speed data 11A, engine water temperature data 11B and engine revolution speed data 11C, and a failure code 11E indicative of a failure detected by the ECU to the data collection unit 14. The B system network sends data from a body's electric component ECU such as data 11F indicative of the state of an accessory (ACC) such as air conditioner and a failure code 11G indicative of a failure detected by the ECU to the data collection unit 14.

The data collection unit 14 itself is a ECU. The data collection unit 14 is controlled by a controller 14H whose main element is a microprocessor. A receiving part 14A sequentially receives the latest data indicative of a state of the vehicle from the vehicle-mounted network 11, and the controller 14H sequentially and temporarily stores the data in a vehicle state data memory 14B. The vehicle state data memory 14B is a random access memory and stores therein the latest data having a predetermined time interval of 20 seconds, for example, which is sequentially rewritten with new data every 0.2 second in first-in first-out (FIFO) shift register system.

A nonvolatile memory 14D is configured of a backup memory for maintaining the memory that a hold current is supplied by a buttery also during power-off or a rewritable ROM such as EEPROM. When receiving a failure code (DTC: Diagnosis Trouble Code), the controller 14H reads data for 15 seconds before the failure code occurs from the vehicle state data memory 14B and stores it in the nonvolatile memory 14D. The data is called onboard snap shot (OBS). The processing is executed each time a failure code occurs, and the nonvolatile memory 14D stores a plurality of OBSs corresponding to a plurality of failure codes.

When the vehicle is brought to a service shop for repair, a service staff connects a connection terminal of a failure diagnosis machine 16 to output terminals of the ECUs, reads the data stored in the nonvolatile memory 14D into the diagnosis machine, and utilizes the diagnosis machine to make a failure diagnosis.

On the other hand, the read data stored in the nonvolatile memory 14D is accumulated in a data accumulation unit 20 as travel data to which the present invention is to be applied. A reference data creation unit 30 is provided for the data accumulation unit 20.

The data stored in the nonvolatile memory 14D may be sent from a vehicle-mounted communication unit to the data accumulation unit 20 until the vehicle is brought to a service shop.

Table 1 shows an example of the OBSs stored in the nonvolatile memory 14D in response to a failure code. In the example, the driving parameters are denoted as R (engine revolution speed), V (vehicle speed) and T (temperature of engine cooling water), but the OBSs contain data for a large number of (50 to 60 depending on a vehicle type, for example) parameters such as an output value of an air-fuel ratio sensor, an output value of a 02 sensor, a fuel ignition time and an air-fuel ratio.

Time is indicated using a minus sign with a time 0.2 second before assuming that the occurrence time of the failure code is 0 second as reference.

TABLE 1

| Time (sec) | R (rpm) | V (km/h) | T (° C.) |
|---|---|---|---|
| −14.8 | 1,461 | 32 | 78 |
| −14.6 | 1,437 | 37 | 78 |
| −14.4 | 1,383 | 36 | 78 |
| −14.2 | 1,353 | 33 | 79 |
| −14.0 | . . . | . . . | . . . |
| −13.8 | . . . | . . . | . . . |
| −13.6 | . . . | . . . | . . . |
| . . . | . . . | . . . | . . . |
| . . . | . . . | . . . | . . . |
| . . . | . . . | . . . | . . . |
| . . . | . . . | . . . | . . . |
| . . . | . . . | . . . | . . . |
| −0.4 | . . . | . . . | . . . |
| −0.2 | . . . | . . . | . . . |
| 0.0 | . . . | . . . | . . . |

How to extract data reference values (normal values) from the OBSs will be described herein. Even the OBS data stored when a failure code occurs has a normal parameter value non relating to the failure. Even the parameter value relating to the failure is considered partially normal during 15 seconds before the failure occurs. Thus, when the OBS data for many failures is collected for statistical processing, an abnormal value is made inconspicuous among many normal values or is excluded, and consequently the parameter values during normal driving can be extracted.

For that purpose, the more the samples is the better. In the example, the number of vehicles as samples is assumed as 13000 and the OBS data is obtained as described above from ordinary users' vehicles actually travelling in a city.

The range of normal values to be extracted is considered existing per "certain state (certain condition)". Thus, when the items of approximate OBS data are collected as cluster (group) and a range of appropriate values is extracted for each cluster, the range of normal values can be extracted for each "certain state."

Specifically, the clustering method is used to classify the items of approximate OBS data as a cluster (group). A range of appropriate values of the parameters is extracted for each cluster and is set as a reference value to be referred during the failure diagnosis.

The clustering is a data analysis method for grouping the data without an external reference, and a method called K-means method is employed in the example. The data is plotted in a space having a dimension corresponding to the number of parameters, and the data is classified depending on its distance.

The reference data creation unit 30 collects the OBSs (one per vehicle) from 13000 vehicles, for example, for one vehicle type.

Next, the collected OBS data is clustered into "20" by the characteristic amounts of three parameters such as "engine revolution speed: R", "vehicle speed: V" and "cooling water temperature: T" (primary clustering).

Further, the "20" clusters extracted in the primary clustering are further clustered into "30" by all the parameters to extract "600" clusters, that is, driving conditions (secondary clustering).

The primary clustering is roughly performed by the three parameters such as "engine revolution speed: R", "vehicle speed: V" and "cooling water temperature: T" on which the primary clustering particularly depends among the driving parameters relating to the occurrence of a failure, and the characteristic amounts of the three driving parameters are first extracted from the respective OBSs.

Figure 2:
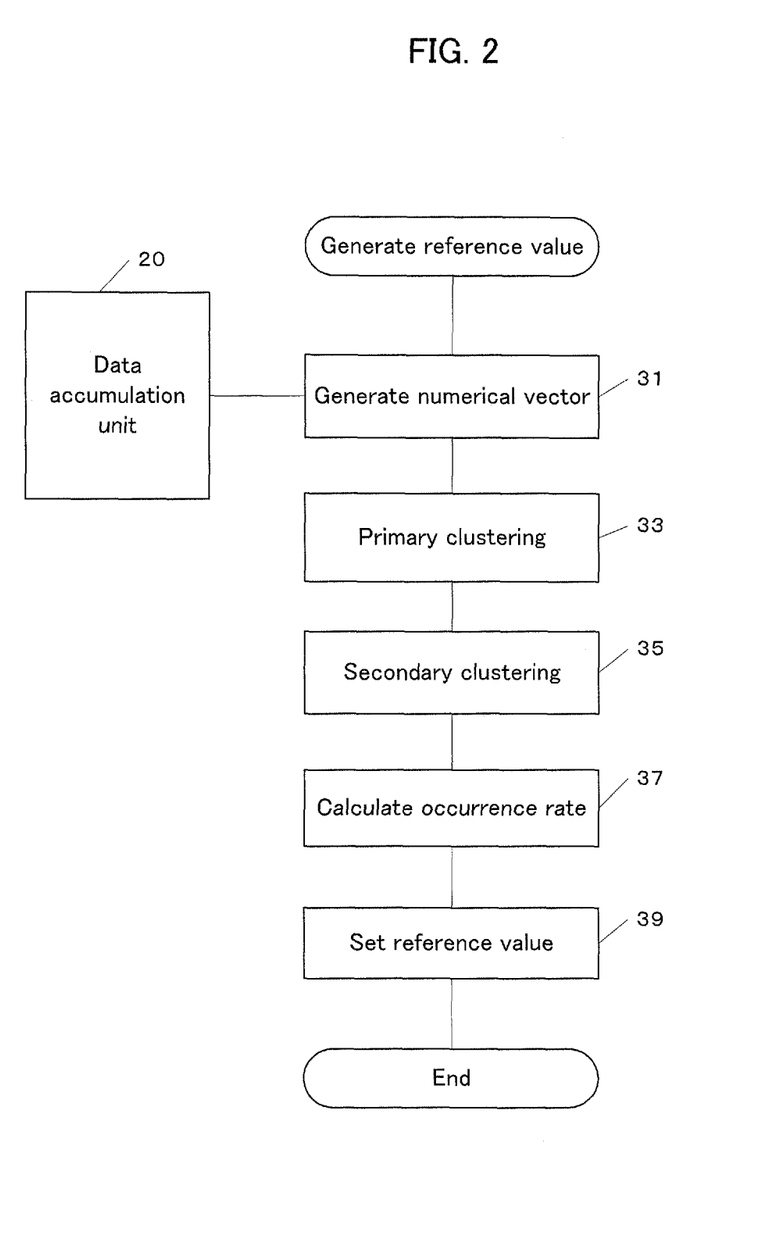
FIG. 2 is a diagram showing a process flow of reference value generation.

An example of reference value generation will be described with reference to FIG. 2 and FIG. 3. At first, the numerical vectors of the characteristic amounts of the driving parameters are generated (31). An average value of the parameters per three seconds, a maximum value, a minimum value, an average value of inclinations are used as the characteristic amounts in the example. The characteristic amounts may employ the numerical values suitable for the vehicle driving parameter analysis from among a standard deviation used in mathematical statistics, an amplitude value, the number of vibration, a minimum inclination, a maximum inclination, a degree of distortion, a kurtosis and the like. The parameters of the OBS data obtained from n (n is 1 to 13000) vehicles are indicated as Rn. Vn and Tn their average values are indicated as $Rn_{av}$, $Vn_{av}$ and $Tn_{av}$, their maximum values are indicated as $Rn_{mx}$, $Vn_{mx}$ and $Tn_{mx}$, their minimum values are indicated as $Rn_{mn}$, $Vn_{mn}$ and $Tn_{mn}$, and their inclination average values are indicated as $Rn_{in}$, $Vn_{in}$ and $Tn_{in}$.

The inclination described herein is the important characteristic amount which may be a judgment index indicative of how much the vehicle is accelerating, decelerating or cruise driving (constant speed driving), and is the value obtained by differentiating the amount of change in the parameter value f(x) relative to an elapsed time (h) to be expressed by the following formula. The inclination can be obtained by the operation of the differential of the parameter value f(x) in the digital operation.

$$\lim \frac{f(x+h)-f(x)}{h}$$

Figure 3:
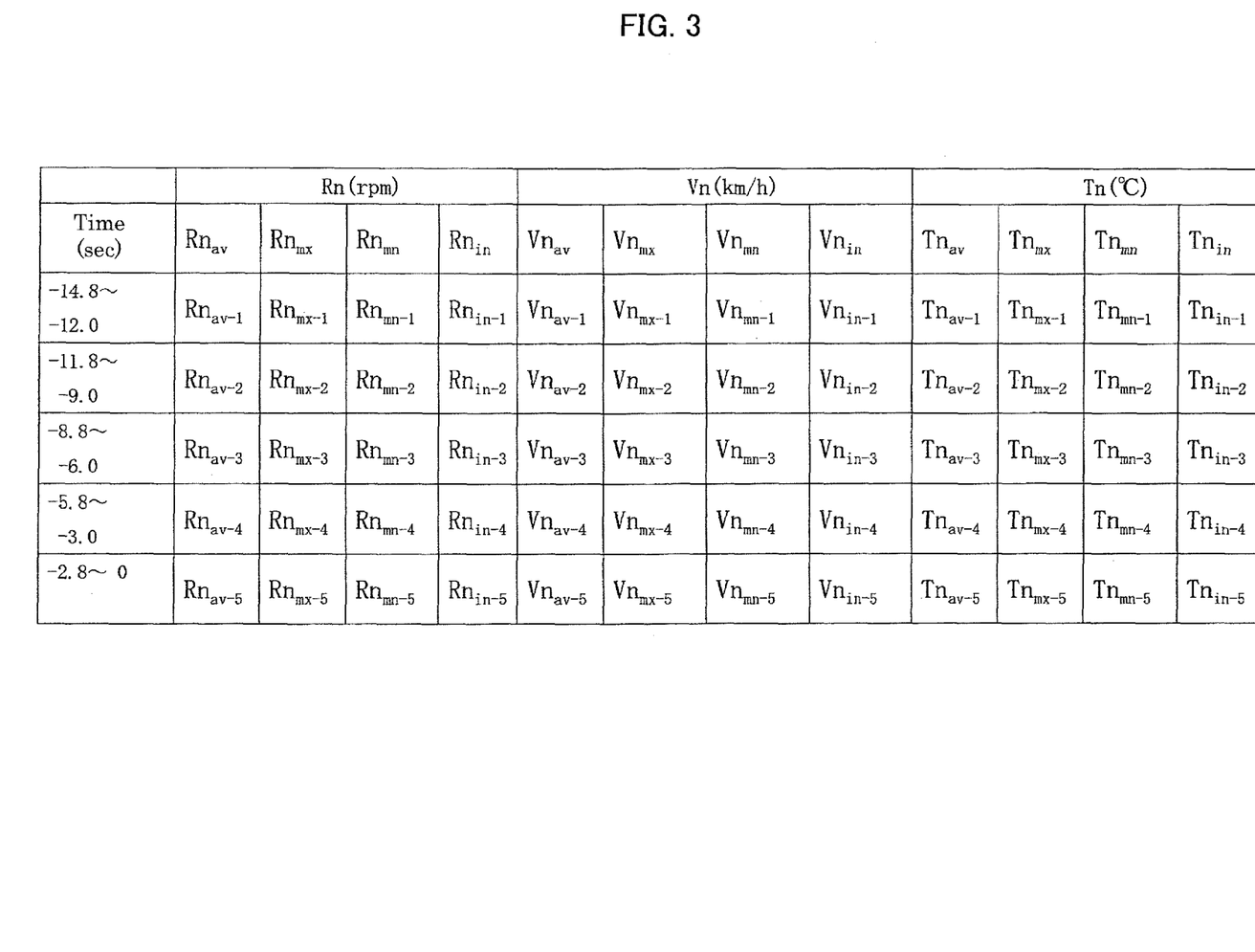
FIG. 3 is a diagram showing numerical vectors indicative of the characteristic amounts of driving parameters.

With reference to FIG. 3, the average value $Rn_{av-1}$, the maximum value $Rn_{mx-1}$, the minimum $Rn_{mn-1}$ and the inclination average value $Rn_{in-1}$ for the parameter Rk are generated for the first time zone (−14.8 to −12.0 seconds). Similarly, the average value $Vn_{av-1}$, the maximum value $Vn_{mx-1}$, the minimum value $Vn_{mn-1}$ and the inclination average value $Vn_{in-1}$ for the parameter V are generated, and $Tn_{av-1}$, $Tn_{mx-1}$, $Tn_{mn-1}$ and $Tn_{in-1}$ for the parameter T are generated. The characteristic amounts shown in table 2 are calculated for the second time zone (−11.8 to −9.0 seconds), the third time zone (−8.8 to −6.0 seconds), the fourth time zone (−5.8 to −3.0 seconds) and the fifth time zone (−2.8 to 0 seconds).

In the example, the respective numerical vectors in the five time zones for the three parameters (Rn, Vn, Tn) such as "engine revolution speed: R", "vehicle speed: V" and "cooling water temperature: T" are classified into, for example, 20 primary clusters Dj by the primary clustering (33). For the initial condition, a main core vector of the 20 primary clusters is randomly defined. The initial value of the core vector can be defined according to an empirical rule from a limited number of items of experimental data. When the main core vector of the j-th cluster is indicated as ($R_{av-cj}$, $R_{mx-cj}$, $R_{mn-cj}$, $R_{in-cj}$, $V_{av-cj}$, $V_{mx-cj}$, $V_{mn-cj}$, $V_{in-cj}$, $T_{av-cj}$, $T_{mx-cj}$, $T_{mn-cj}$, $T_{in-cj}$) assuming that j is an integer from 1 to 20, a Manhattan distance D1nj between the numerical vector in the first time zone in the above table and the respective core vectors of the 20 clusters Dj is calculated in the following formula.

$$D1nj = |Rn_{av-1}-R_{av-cj}|+|Rn_{mx-1}-R_{mx-cj}|+|Rn_{nm-1}-R_{mn-cj}|+ \\ |Rn_{in-1}-R_{in-cj}|+|Vn_{av-1}-V_{av-cj}|+|Vn_{mx-1}-V_{mx-cj}|+ \\ |Vn_{mn-1}-V_{mn-cj}|+|Vn_{in-1}-V_{in-cj}|+|Tn_{av-1}-T_{av-cj}|+ \\ |Tn_{mx-1}-T_{mx-cj}|+|Tn_{mn-1}-T_{mn-cj}|+|Tn_{in-1}-Tn_{in-cj}| \qquad (1)$$

The operation of the formula (1) with j=1, 2, 3, . . . 20 is performed to find the Manhattan distance for one numerical vector (Rn, Vn, Tn) in the first time zone to cause the numerical vector (Rn, Vn, Tn) to belong to the cluster Dj of the core vector having the smallest value. The similar operation is performed on n=1, 2, 3, . . . , 13000 to cause the respective numerical vectors (Rn, Vn, Tn) to belong to the cluster Dj having the smallest Manhattan distance relative to the core vector. In this way, the numerical vector in the first time zone of the OBS data obtained from n vehicles are classified into 20 clusters Dj.

The Manhattan distance D2nj between the numerical vector in the second time zone and the cluster D2j in the second time zone in the above table is similarly calculated in the following formula also for the second time zone.

$$D2nj = |Rn_{av-2}-R_{av-cj}|+|Rn_{mx-2}-R_{mx-cj}|+|Rn_{mn-2}-R_{mn-cj}|+ \\ |R_{in-2}-R_{in-cj}|+|Vn_{av-2}-V_{av-cj}|+|Vn_{mx-2}-V_{mx-cj}|+ \\ |Vn_{mn-2}-V_{mn-cj}|+|Vn_{in-2}-V_{in-cj}|+|Tn_{av-2}-T_{av-cj}|+ \\ |Tn_{mx-2}-T_{mx-cj}|+|Tn_{mn-2}-T_{mn-cj}|+|Tn_{in-2}-T_{in-cj}| \qquad (2)$$

The numerical vector in the second time zone of the OBS data obtained from n vehicles is classified into 20 primary clusters Dj based on the Manhattan distance. Similarly, the numerical vector in the third time zone is classified into 20 primary clusters Dj, and the numerical vector in the fourth time zone and the numerical vector in the fifth time zone are classified into 20 primary clusters Dj, respectively.

Then, an average value of the numerical vectors which belongs to each of the 20 primary clusters Dj is calculated and the average value is set as a core vector of each cluster. The thus-updated core vector is used to perform the above clustering again. When the core vector of each cluster is updated in the second clustering, the updated core vector is used to further perform the third clustering. The repetition is performed until the core vector converges or until a preset number of times of trials ends.

Since the way of the convergence is different depending on the core vector at the initial setting, for example, ten different initial settings are randomly prepared to repeat the clustering using a respective initial setting, and consequently the clustering result whose trial is converged the best can be employed. In this manner, the final core vectors (centers of gravity) can be obtained for the 20 primary clusters Dj, respectively.

The final core vectors are used to perform the clustering on the 20 primary clusters, thereby completing the primary clustering for 65000 items of data (13000 vehicles×5 items/vehicle). Since the most important driving parameters are used to perform the primary clustering, thereby grouping the numerical vectors having a high degree of approximation, all the items of data are roughly grouped depending on a difference in a driving state having a high importance. Thus, the respective groups, that is, clusters are formed corresponding to a driving state having a relatively large difference.

Then, the processing proceeds to the secondary clustering (35). In the secondary clustering, the clustering is further performed on the OBS numerical vectors (obtained by extending the numerical vectors of FIG. 3 to all the parameters) of all the parameters contained in the cluster, to classify each primary cluster into 30 secondary clusters. In other words, the 20 primary clusters corresponding to the respective different driving states are subdivided into 30 secondary clusters.

Since the respective primary clusters are subjected to the secondary clustering to form the 30 secondary clusters, 600 (20×30) secondary clusters in total are obtained. The respective OBS numerical vectors (65000 items of data in the example) belong to one of the 600 secondary clusters.

The initial values of the core vectors of the 30 secondary clusters used for the secondary clustering can be randomly defined similar to the primary clustering. The initial values can be defined according to an empirical rule in terms of the past data. The core vectors are updated by the same method as the primary clustering to find the final core vectors, and the 30 final core vectors are used to perform the final clustering, thereby forming the 600 secondary clusters.

Next, the processing proceeds to an occurrence rate calculating step 37, where a 20-divided histogram is created from the thus-obtained data of the 600 secondary clusters with the horizontal axis as the value of parameter and the vertical axis as the number of items of data per parameter (FIG. 4A). The class in which the value of the vertical axis is equal to or less than a predetermined value (a % of the total, for example) is excluded (FIG. 4B) and the remaining classes are grouped in units of adjacent classes such that the number of items of data which belongs to the group is b % or more (FIG. 4C). The processing is independently performed per cluster, that is, for the 600 secondary clusters.

At this time, the values of a % and b % are adjusted by the parameter residue of the clustering as a guide of the dispersion of the OBS data in the secondary cluster. The parameter residue is indicative of how long a respective parameter value of the numerical vector is away from the core vector as the center of gravity of the cluster to which the numerical value belongs. In the example, a difference between a respective numerical vector and the center of gravity of its belonging cluster is taken and the root-mean-square of the difference (square root of square sum) indicates the residue. Since a simple difference has a sign of plus or minus, the root-mean-square is used to know a magnitude of the difference.

For the parameter in which the parameter residue is larger and the dispersion is larger, a % and b % are reduced to widely extract a range of normal values (FIG. 4D).

Figure 4:
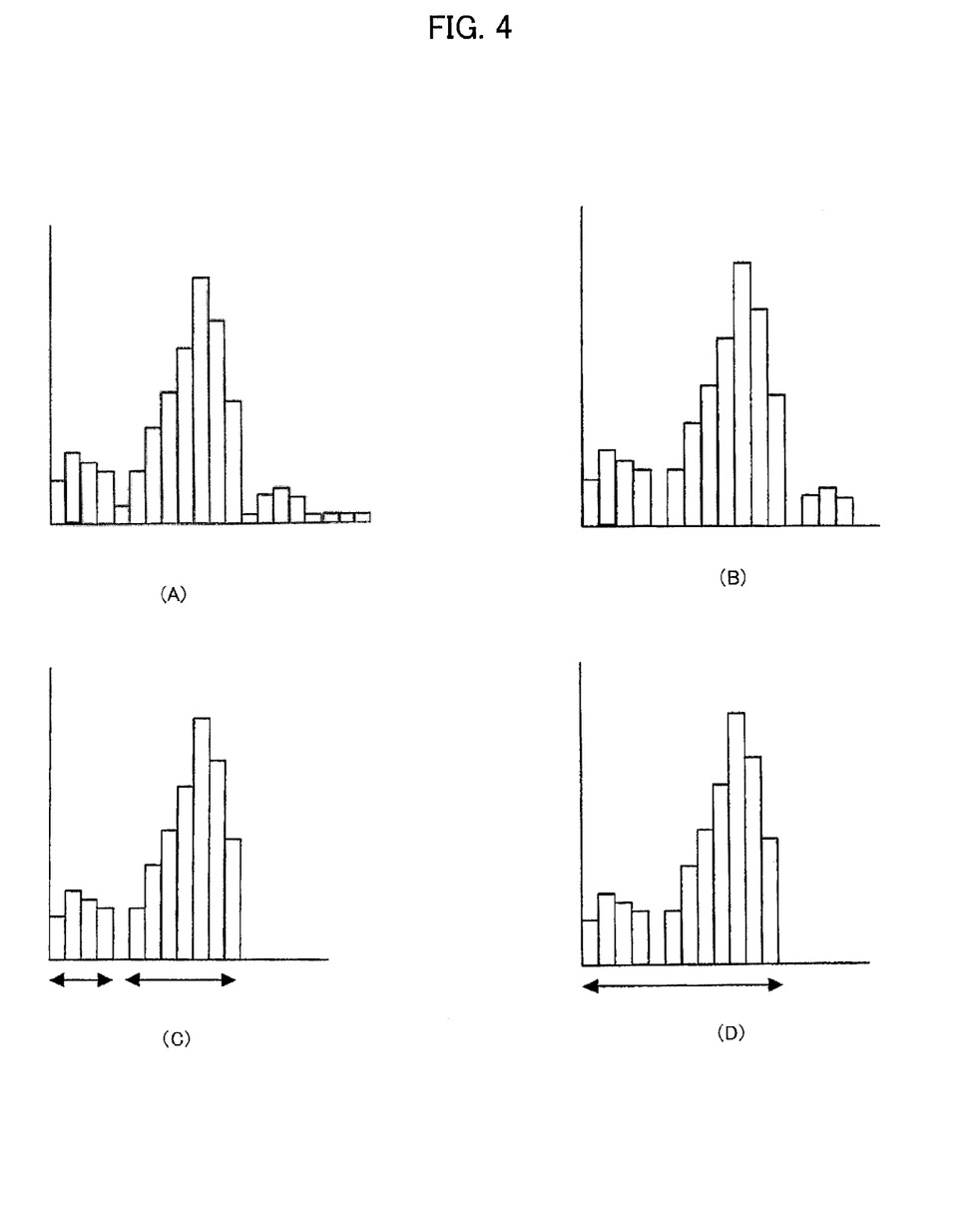
FIG. 4 is histograms showing occurrence rates of numerical values of the characteristic amounts.

The method described with reference to FIG. 4 will be specifically described with a simple example. A histogram per column (parameter) in FIG. 3 is created for all the numerical vectors in a certain cluster. For example, it is assumed that the histogram as shown in FIG. 2 is obtained for one of the characteristic amounts of certain driving parameters. If the cluster contains 100 numerical vectors, the total number of counts is 100.

TABLE 2

| Range of values in column | Number of counts |
|---|---|
| 0.0-0.1 | 22 |
| 0.1-0.2 | 0 |
| 0.2-0.3 | 0 |
| 0.3-0.4 | 18 |
| 0.4-0.5 | 30 |
| 0.5-0.6 | 14 |
| 0.6-0.7 | 2 |
| 0.7-0.8 | 0 |

TABLE 2-continued

| Range of values in column | Number of counts |
|---|---|
| 0.8-0.9 | 9 |
| 0.9-1.0 | 5 |

The count bars having a % or less of the total number of counts are deleted. Assuming that a % is 1%, the bars having the number of counts of 1 or less are deleted and the bars in table 3 remain. In the example of FIG. 4, the processing proceeds from the histogram of FIG. 4A to the histogram of FIG. 4B.

TABLE 3

| Range of values in column | Number of counts |
|---|---|
| 0.0-0.1 | 22 |
| 0.3-0.4 | 18 |
| 0.4-0.5 | 30 |
| 0.5-0.6 | 14 |
| 0.6-0.7 | 2 |
| 0.8-0.9 | 9 |
| 0.9-1.0 | 5 |

Adjacent bars are combined and grouped in the mauling bars. In this example, the bars are grouped as shown in table 4.

TABLE 4

| Group ID | Range of values in column | Number of counts |
|---|---|---|
| 1 | 0.0-0.1 | 22 |
| 2 | 0.3-0.7 | 64 |
| 3 | 0.8-1.0 | 14 |

The groups having the total number of counts of b % or less are deleted. For example, the groups having 20% or less are deleted, the group having the group ID of 3 is deleted and the groups in table 5 remain. In the example of FIG. 4, the processing proceeds from the histogram of FIG. 4B to the histogram of FIG. 4C.

TABLE 5

| Group ID | Range of values in column | Number of counts |
|---|---|---|
| 1 | 0.0-0.1 | 22 |
| 2 | 0.3-0.7 | 64 |

The processing then proceeds to a reference value setting step 39, where the range of the columns in the remaining groups, that is, the characteristic amounts of the driving parameters is set as a range of the normal values. In the example, 0.0 to 0.1 and 0.3 to 0.7 are the ranges of the normal values. In order to simplify the data processing, the ranges of the normal values are collected into one to be a range of reference values used for the failure diagnosis. In the example, the range of the reference values is between 0.0 and 0.7. In the example of FIG. 4, the processing proceeds from FIG. 4C to FIG. 4D.

As described above, in the embodiment, the range of the normal values of the respective driving parameters can be generated under a condition in which 600 driving situations are different.

In order to make a diagnosis of a filed vehicle using the normal value data, the ECU data to be diagnosed in the failed vehicle is read by the diagnosis machine and the most similar driving situation data is retrieved from among the normal value data (600 items of driving situation data as different driving situations). Then, the normal value data of the retrieval result and the ECU data to be diagnosed are compared with each other to judge which parameter is off the reference value (the range of the normal values) among the driving parameters under the same condition, thereby retrieving a failure portion based on the judgment.

There are various methods for retrieving the most similar items of driving situation data, and as one example thereof, the characteristic amount of each driving parameter of the ECU data is calculated as described in the embodiment, and the items of normal value data similar to the ECU data are approximately retrieved from the 600 items of normal value data to select the target normal value data.

The present invention has been described above with the specific embodiment. The present invention is not limited to the embodiment.

DESCRIPTION OF NUMERALS

14: Data collection unit
16: Diagnosis machine
20: Data accumulation unit
30: Reference data generation unit

The invention claimed is:

1. A system for generating reference values to be used for diagnosis of trouble in vehicles, the system comprising:
an accumulating storage for storing onboard snap shot (OBS) data of a plurality of driving parameters that are stored in storage devices of electronic control units (ECUs) of vehicles when trouble takes place, the OBS data read out from a large number of vehicles in trouble that are brought for diagnosis; and
a reference value generating unit that is configured to
a) generate numerical vectors of the driving parameters for each one of predetermined time periods for each one of the large number of vehicles in trouble that are brought for diagnosis using the OBS data accumulated in the accumulating storage;
b) group the numerical vectors into a plurality of clusters based on characteristics of the parameters included in the numerical vectors;
c) identify, for each driving parameter in each one of the plurality of clusters, one or more ranges of values of high occurrence rate; and
d) store said one or more ranges of values of high occurrence rate as a range of normal values of the driving parameters in each one of the clusters, said range of normal values representing certain driving conditions,
wherein, because said OBS data stored in the accumulating storage contain a larger number of normal values than the abnormal values, the abnormal values included in the OBS data that are read out from the large number of vehicles are diluted or excluded by performance of said reference value generating unit of performing steps a), b), c) and d); and
wherein the range of normal values of the driving parameters thus stored is used as a range of said reference values for diagnosing troubles of vehicles.

2. The system according to claim 1, wherein the driving parameters include at least one of engine revolution speed, vehicle speed and cooling water temperature for a predetermined time period before a failure of a vehicle occurs.

3. The system according to claim 2, wherein the reference value generating unit is further configured to divide the onboard snap shot (OBS) data into a plurality of time zones for each record, to calculate characteristics of the driving parameters for each time zone, and to generate numerical vectors of the characteristics.

4. The system according to claim 3, wherein the reference value generating unit is further configured to calculate distance between the numerical vectors of the characteristics for each time zone and a plurality of first clusters each having core vectors of initial values, and to group each numerical vector of the characteristics into a first cluster that is nearest to the numerical vector of the characteristics, thereby producing the plurality of first clusters.

5. The system according to claim 4, wherein the reference value generating unit is further configured to:
e) calculate for each one of the first clusters an average of the numerical vectors of the characteristics belonging to the each one cluster, said average replacing the initial value of the core vectors of a corresponding first cluster,
f) calculate distance between the numerical vectors of the driving parameters in each record for each time zone and the core vectors of each one of the first clusters, and group each numerical vector into a first cluster that is nearest to the numerical vector, thereby updating the plurality of first clusters.

6. The system according to claim 5, wherein g) the processes of e) and f) are repeated until the centers of the core vectors converge or until a preset number of times of trial is done.

7. The system according to claim 6, wherein grouping of numerical vectors into the plurality of first clusters is performed for one or more of predetermined driving parameters, and for the plurality of first cluster a secondary clustering is performed for a larger number of driving parameters for each one of the first clusters to group into a plurality of second clusters.

8. The system according to claim 7, wherein for the numerical vector of each second cluster, rate of occurrence is calculated for each driving parameter, and the range of numerical values having high occurrence rate are allocated as reference values for a corresponding driving parameter.

9. A method for generating reference values that are to be used in diagnosis of a trouble of a vehicle by comparing the reference values with onboard snap shot (OBS) data, the method comprising:
a) reading out, by a data accumulation system, for storing in an accumulating storage, onboard snap shot (OBS) data of a plurality of driving parameters that are stored in a storage device of an electronic control unit (ECU) of the vehicle when the trouble takes place, wherein the reading out comprises reading out the OBS data from a large number of vehicles in trouble that are brought for diagnosis;
b) generating, by a reference value generating system, numerical vectors of the driving parameters for each one of predetermined time periods for each one of the vehicles that are brought for diagnosis using the OBS data accumulated in the accumulating storage;
c) grouping, by the reference value generating system, the numerical vectors into a plurality of clusters based on characteristics of the parameters included in the numerical vectors;
d) identifying, by the reference value generating system, for each driving parameter in each cluster one or more ranges of values of a corresponding driving parameter that have large counts of numerical vectors; and
e) storing, by the reference value generating system, said one or more ranges of values as a range of normal values of the driving parameters in a corresponding cluster, which represents certain driving condition, wherein, because said OBS data stored in the accumulating storage contain a larger number of normal values than the abnormal values, the abnormal values included in the OBS data that are read out from the large number of vehicles are diluted or excluded in the process of b), c), d), and e); and wherein the range of normal values is used as said reference values in diagnosis of troubles.

10. The method according to claim 9, wherein the driving parameters include at least one of engine revolution speed, vehicle speed and cooling water for a predetermined time period before a failure of a vehicle occurs.

11. The method according to claim 10, wherein the method further comprises:

dividing, by the reference value generating system, the onboard snap shot (OBS) data into a plurality of time zones for each record;

calculating, by the reference value generating system, characteristics of the driving parameters for each time zone; and generating, by the reference value generating system, numerical vectors of the characteristics.

12. The method according to claim 11, wherein the method further comprises:

calculating, by the reference value generating system, distance between the numerical vectors of the characteristics for each time zone and a plurality of first clusters each having core vectors of initial values; and grouping, by the reference value generating system, each numerical vector of the characteristics into a first cluster that is nearest to the numerical vector of the characteristics, thereby producing the plurality of first clusters.

13. The method according to claim 12, wherein the method further comprises:

a1) calculating, by the reference value generating system, for each one of the first clusters an average of the numerical vectors of the characteristics belonging to the cluster, said average replacing the initial values of the core vectors of a corresponding first cluster, b1) calculating, by the reference value generating system, distance between the numerical vectors of the driving parameters in each record for each time zone and the core vectors of each one of the first clusters, and group each numerical vector into a first cluster that is nearest to the numerical vector, thereby updating the plurality of first clusters.

14. The method according to claim 13, wherein c1) the processes of a1) and b1) are repeated until the centers of the core vectors converge or until a preset number of times of trial is done.

15. The method according to claim 14, wherein grouping of numerical vectors into the plurality of first clusters is performed for one or more of predetermined driving parameters, and for the plurality of first cluster secondary clustering is performed for a larger number of driving parameters for each one of the first clusters to group into a plurality of second clusters.

16. The method according to claim 15, wherein for the numerical vector of each second cluster, rate of occurrence is calculated for each driving parameter, and the range of numerical values having high occurrence rate are allocated as reference values for a corresponding driving parameter.

* * * * *